3,823,072
ANALYSIS OF PROTEOLYTIC ENZYMES
Michel Hooreman, 9 Rue Marbeau, Paris 16, France
Original application Feb. 19, 1970, Ser. No. 12,595, now Patent No. 3,683,069. Divided and this application June 9, 1972, Ser. No. 261,522
Int. Cl. G01n 31/14
U.S. Cl. 195—103.5 R          4 Claims

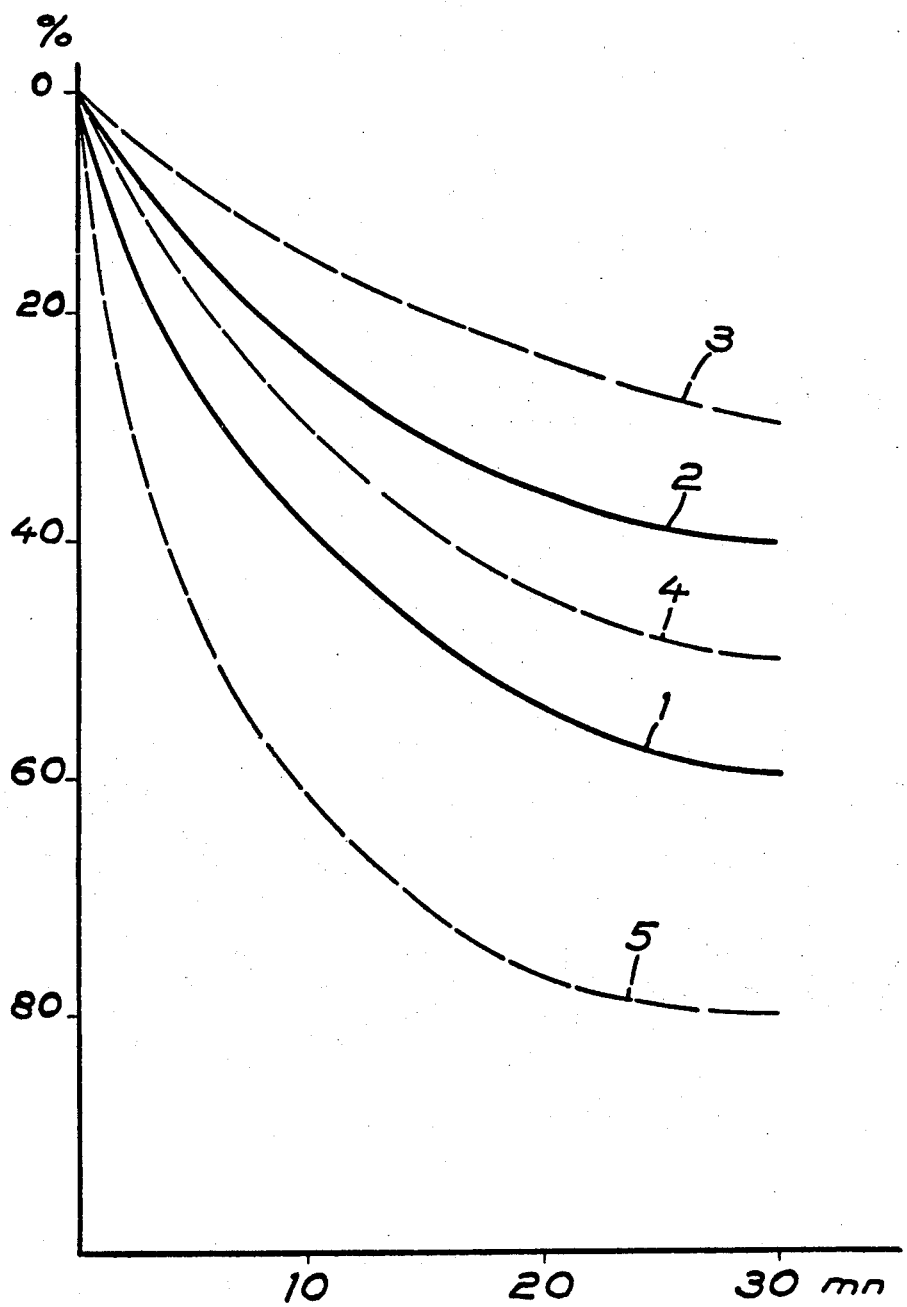

ABSTRACT OF THE DISCLOSURE

The invention provides proteolytic enzymes which, on administration, optimise the *in vivo* viscosity of the mucuses and which are characterised by bringing the magnitude of the *in vitro* viscosity to a value generally between those values obtained when mucus is subjected to identical treatments with trypsin and chymotrypsin.

REFERENCE TO RELATED APPLICATIONS

This application is a division of my copending application Ser. No. 12,595, filed Feb. 19, 1970, now U.S. Pat. 3,683,069.

BACKGROUND OF THE INVENTION

The present invention relates to new proteolytic enzymatic products which possess the fundamental property of being able to bring about, *in vivo*, optimisation of the viscosity of mucuses, especially of the intestinal mucus, of the bronchial mucus and of the cervical mucus. It also relates to the preparation, and to the foodstuff, veterinary, dietetic and pharmaceutical applications.

The constant development of intensive animal breeding in industrialised countries and the severe shortage of animal proteins in the developing countries make it necessary to increase the rate of growth of animals and reduce their consumption index.

Recently, the effect of adding various ordinary enzymes (proteolytic, lipolytic or amylolytic enzymes), capable of facilitating the digestion of the principal constituents of foodstuffs (proteins, lipids, and carbohydrates) to compound feedstuffs for animals has been studied. It would generally have been assumed that these exogenic enzymes, when supplementing endogenic enzymes, would facilitate the *in vivo* digestion, and as a result increase the rate of growth of the animals. None of these studies have hitherto led to results of practical value: the slight and varying improvement in the speed of growth and in the consumption index which has sometimes been observed has been too low and irregular in relation to the price of the enzymes added.

The present invention provides enzymes which differ from ordinary enzymes by their ability to optimise the viscosity of the intestinal mucus and hence to increase the speed of absorption of digested foodstuffs and equally that of medicines taken orally.

The intestinal mucous membrane, which like all mucous membranes, is delicate, is protected against attack by the external medium by means of a layer of a viscous liquid, the intestinal mucus. The viscosity of this mucus is related to the presence of macromolecules of mucins and of mucopolysaccharides which, linked together by protein bridges, form a tight crosslinked structure.

The intestinal mucus thus forms a sort of protective barrier between the mucous membrane and the bolus of food which is being digested. This barrier prevents the intestinal wall from coming into too close contact with the large molecules of endogenic enzymes (trypsin and chymotripsin) which cause the digestion of the foodstuffs but can finish by attacking the mucous membrane itself. On the other hand this barrier must allow small molecules of digested foodstuffs to filter rapidly, these small molecules having to pass this intestinal wall in order to join the bloodstream.

If it is excessively viscous, the intestinal mucus may restrict the passage of the digested foodstuffs into the blood; if it is insufficiently viscous, it may not protect the mucous membrane.

This invention is based on the following two surprising discoveries:

A. It is possible to manufacture industrially, by fermentation, protecolytic enzymes whcih are able *in vivo* to impart the optimum viscosity in question to the intestinal mucus. When administered orally, e.g., added to the foodstuffs and/or the drinking water, these enzymes cause a controlled and reversible reduction in the viscosity of the intestinal mucus and as a result a selective increase in the speed of absorption of the digested foodstuffs, and also of medicines administered orally at the same time, or immediately after, these enzymes.

The ordinary proteolytic enzymes which have unsuccessfully been tried in animal feeding have either an inadequate or excessive effect on the viscosity of the intestinal mucus. In the first case, the speed of absorption across the intestinal wall remains unchanged. In the second case, the excessive effect of the enzyme, like, indeed, any other irritant action, causes an abrupt discharge of the contents of the mucus glands into the intestine, with accelerated re-formation of the contents of these glands. This undesirable hypersecretion of mucus which is markedthe digested food will result in an increase in the speed of ly apparent on simple examination with the naked eye of the intestinal wall of autopsied animals, is comparable with the undesirable hypersecretion of sebum caused by an excessively detergent shampoo.

The existence of proteolytic enzymes capable of optimising the viscosity of the intestinal mucus, that is to say capable of markedly reducing this viscosity without risk of a reaction hypersecretion, was thus not *a priori* obvious.

B. This optimisation of the viscosity of the mucus and consequently this increase in the speed of absorption of the digested food will resul in an increase in the speed of growth of the animals and a lowering of their consumption index. This also was not obvious.

In view of the length of the intestinal tract, the foodstuffs are always completely absorbed, and experience has shown that normally only residues without significant foodstuff value remain in the faeces. However, this complete absorption does not indicate an optimum utilization of the foodstuffs. It could be assumed that it would be desirable for the blood to contain all the factors of anabolic synthesis simultaneously and at a sufficient concentration, but only experience was able to confirm the following law, which was not *a priori* obvious: in order to maximize the speed of growth, it is preferable to achieve a maximum concentration of the digested foodstuffs in the blood for a relatively short time, rather than an average concentration for a longer time, even if in both cases the total amount of foodstuffs passed into the blood is the same.

The enzymatic products according to the invention which are able *in vivo* to cause adequate optimization of the mucus are characterised firstly by comparing their effect *in vitro* on the intestinal mucus with the effects of two proteolytic enzymes having a natural optimising effect; trypsin and chymotripsin, the comparison being carried out in accordance with the controlled viscosity reduction test (RMV test). The enzymatic products are also characterized by their insensitivity towards trypsin inhibitors, this latter condition ensuring an *in vivo* effect.

More precisely, the reduction in the viscosity of the intestinal mucus by the said enzymatic products must be within about ±5%, relative to the viscosity of the corresponding untreated mucus, of the values of the reduction in viscosity due to trypsin and to chymotrypsin, that is to say respectively between 60+5=65% and 40−5=35% relative to the viscosity of the untreated mucus, under conditions which will be defined later.

According to a characteristic of the invention, the *in vitro* reduction of the viscosity of the intestinal mucus due to the said enzymatic products is exactly between those due to trypsin and to chymotrypsin, that is from 60 to 40%.

The process according to the invention which comprises fermentation of micro-organisms which produce proteolytic enzymes is also based on the RMV test, the fermentation being stopped when the enzymatic substances give a percentage reduction, relative to the viscosity of the untreated mucus, of the viscosity equal at least between that due to chymotrypsin reduced by 5%, and at most that of trypsin increased by 5%, the percentages being in all cases evaluated relative to the viscosity of the untreated mucus. The process also includes purifying the products obtained when the latter have proved insensitive to trypsin inhibitors.

The producing micro-organisms are selected from among those which yield enzymatic products which meet the following two conditions: a positive RMV test and insensitivity to trypsin inhibitors. Among the suitable micro-organisms, the inventor has been more particularly interested in fungi of the genus *Streptomyces* and of the species *fradiae*. This is not to be considered as imposing a limitation because of the large number of micro-organisms which are suitable.

DESCRIPTION OF THE RMV TEST (a) Preparation of the enzymatic product to be studied A micro-organism which produces mixtures of proteolytic enzymes in significant amounts is fermented in accordance with conventional techniques. At the end of the fermentation, the medium is filtered, concentrated, lyophilised or atomised. A crude enzymatic product is thus obtained. Alternatively, and preferably, after filtering and concentrating, the product is obtained by precipitation with ammonium sulphate and dried *in vacuo*. A partially purified enzymatic product is thus obtained which according to the conventional Ansom technique must contain at least 1,000 units per mg.

One Ansom unit (or, for brevity, A.U.) is here defined as being the amount of enzyme which when incubated for 10 minutes at 25° C. and at pH 7.5 in the presence of denatured haemoglobin, liberates from this substrate the equivalent of 1 micro gram of tyrosine, as determined by photometric absorption at 280 milli microns on the filtrate which can not be precipitated with trichloracetic acid.

(b) Measurement

Calf mucus or pig mucus is used as the substrate immediately after slaughtering the animal after dieting for 24 hours, 3 successive sections of intestine, each of about 1 mtre, are taken, starting from the stomach. One end is ligatured and the surface mucus is made to issue from the other end by applying slight pressure and is removed; thereafter, the deep mucus is collected by strong pressure or by scraping the internal wall of the intestine which has beforehand been split open, and the soluble phase of the mucus is separated therefrom by washing with 3 volumes of water followed by centrifugation. On an average, 50 ml. of insoluble mucus is collected per animal; this mucus can be stored for several days at −20° C. or used immediately for viscosimetric studies.

The Brookfield cone-plate microviscometer, which makes it possible to work on 1 g. of insoluble mucus, is used for these studies. The angular speed of the moving cone is generally adjusted to 12 r.p.m. and the temperature to 37° C. A scale graduated from 0 to 100 makes it possible to determine the relative viscosity by direct reading. The index is adjusted to 100 with the mucus alone and 0.1 ml. of a solution buffered to pH 7.5 and containing the enzymatic product to be studied is then added. If this product is active, the viscosity drops rapidly and the curve of the drop in viscosity can be recorded as a function of the time. The reference enzymes trypsin and chymotrypsin are preferably used in a highly purified form, respectively containing 16,000 and 20,000 A.U./mg. They cause a reduction in viscosity of the mucus which reaches a plateau in less than 30 minutes so that the duration of a test can be fixed at 30 minutes. For a concentration of 50 A.U. per gram of mucus, these enzymes cause a reduction in viscosity of 20%; for a concentration 5 times higher, namely 250 A.U. per g. of mucus, they cause a reduction in viscosity which is generally 60 and 40% respectively. The calf or pig mucus furthermore varies from one animal to the other so that these results can vary depending on the sample of mucus used; if results excessively far away from the preceding values are obtained, it is possible either to discard the sample of mucus or to treat it by fractional precipitation and re-suspension, so as to return approximately to these values.

Using such a sample of mucus, the reduction in viscosity caused by 250 A.U. of the enzymatic product to be studied per 1 g. of mucus is determined. If this reduction is preferably between 40 and 60% and more generally between 35 and 65% the enzymatic product satisfied the RMV test and hence will cause the desired optimisation of the viscosity of the mucus.

The action of the enzymes on the mucus is illustrated by FIG. 1 of the drawing which gives the percentage reduction as the ordinates as a function of the time (in minutes) as the abscissae. This figure groups together the curves obtained with trypsin (curve No. 1) and chymotrypsin (curve No. 2), with an enzyme which does not satisfy the RMV test because of an insufficient effect (papain, curve No. 3), with an enzyme which exactly satisfied the RMV test (enzyme from *Streptomyces fradiae*, batch 2, curve No. 4), and finally with an enzyme which does not satisfy the RMV test because of an excessive effect (enzyme from *Bacillus subtilis*, Curve No. 5). The results obtained by using these enzymes in animal feeding are furthermore described below (Example 1).

(c) Mode of action—indirect characterization

If certain enzymatic products thus cause a controlled reduction in the viscosity of the mucus, this is in fact because they have a controlled effect on the proteins which in the mucus form bridges between the macromolecules of mucins and of mucopolysaccharides. Such products degrade the proteins to the polypeptides stage without systematically going to the stage of the aminoacids.

This fact makes it possible indirectly to recognize the products which satisfy the RMV test: they are products which degrade the proteins of the mucus and hence also certain other proteins, forming polypeptides of which the average size is comparable to that of the polypeptides obtained by the action of trypsin and of chymotrypsin on these same proteins.

The direct process and the indirect process of recognising products which satisfy the RMV test give results which without being entirely identical are nevertheless largely concordant; it is thus possible to select these products by one or other of these processes.

SPECIFICITY OF THE RMV TEST

The selection by the RMV test is one of the two essential conditions which the enzymatic products which can be used according to the invention have to fulfill. The other of these conditions, as will be seen below (Example 1) is that these products should be practically insensitive to trypsin inhibitors.

The enzymatic products which satisfy the RMV test are a small minority relative to the great majority of products which do not satisfy this test either because of giving an insufficient effect or an excessive effect. The products which satisfy the RMV test and which are also practically insensitive to trypsin inhibitors form an even smaller minority.

The preceding double condition can be described as characteristic. In effect, as will be seen below, for a particular example (Example 1) experience shows that the enzymatic products which fulfill this double condition have a favorable influence on the growth of the animals and more generally are really effective in foodstuffs, veterinary, dietetic and pharmaceutical compositions according to the invention. Conversely, as will be seen in the same example, the products which do not fulfill this double condition have an unfavorable, zero or slight and inconstant effect on the growth of the animals; this effect is thus of the same order as that of the enzymatic products already proposed in animal feeding prior to the invention and which have not been able to achieve final market acceptance because of the poor results obtained.

The great value of a selection of the enzymatic products by means of the preceding characteristic double condition is that it makes it possible to rapidly and efficiently recognize the products which are suitable for the desired objective. This avoids long and costly experiments on large series of animals which have often been attempted but have hitherto only led to results which have no practical use.

In order to prepare enzymatic products in accordance with the invention two strains of *Streptomyces fradiae* No. 1998 and No. 2019 of the collection of the National Museum of Natural History in Paris) were employed.

Using the conventional techniques of fermentation, one of these strains is cultured in an industrial production medium having the following composition in g./l., of medium: soya flour 30 g./l., glucose 30 g./l., dipotassium phosphate 0.8 g./l., calcium carbonate 10 g./l.; pH 7.0. The fermentation temperature is fixed at 28° C. and the aeration at 0.3 volume of sterile air per volume of medium and per minute.

Under these conditions, *Streptomyces fradiae*, does not produce antibiotics and instead produces at least 5 proteases and 2 peptidases. These various enzymes can only be detected by long analytical techniques which are impracticable in routine work and nevertheless it is necessary as far as posible to avoid the formation of certain of these enzymes and especially of the peptidases wich in too high a concentration are distinctly undesirable. However, the essential aspect is that the enzymatic mixture obtained should satisfy the RMV test, which can be rapidly carried out and can thus be adapted to industrial routine. In general, some of this enzymatic mixture does not satisfy the RMV test at the start of the fermentation because it has an inadequate effect, does satisfy the RMV test in the middle of the fermentation and does not satisfy the RMV test at the end of the fermentation because it has an excessive effect. Using the method described above, the fermentation is stopped when the effect of the resulting enzymatic mixture on the mucus begins to exceed that of chymotrypsin without reaching that of trypsin. This duration of fermentation can vary from one manufacture to the next because of minimal and practically uncontrollable variations of the fermentation conditions; however, this duration generally remains between 60 and 84 hours and the total strength of the fermented mixture is generally about 3,000 A.U./ml.

The following products are prepared from this fermented medium by conventional extraction techniques, but applying the RMV test control throughout:

Product A: The filtered fermented medium is concentrated *in vacuo*; a crude liquid enzymatic product containing at least 50,000 A.U./ml. is obtained.

Product B: A crude solid enzymatic product containing at least 100 A.U./mg. is produced from Product A by atomising.

Product C: A partially purified enzymatic product containing at least 1,000 A.U./mg. is obtained from Product A by saline precipitation (ammonium sulphate) and drying *in vacuo*.

Product D: A moderately purified enzymatic product containing at least 10,000 A.U./mg. and showing a relative electrophoretic monodispersion of the enzymatic activity is obtained from Product A by a series of precipitations with ammonium sulphate and solvents, especially acetone, followed by redissolving, and by drying the final precipitate *in vacuo*.

Product E: The predominant enzyme is separated from Product D by electrophoresis in the liquid phase, or column chromatography, dialysis and lyophilisation, in a highly purified form containing at least 50,000 A.U./mg. and showing an absolute electrophoretic monodispersion.

All these products by definition satisfy the RMV test. In order to be usable according to the invention they must additionally be practically insensitive to trypsin inhibitors, as will be seen below (example 1). Experience shows that this is indeed the case for the above products. Hence these products form a particular group of enzymatic products which can be used according to the invention. Furthermore, though in each case employing the RMV test, other particulate groups of enzymatic products which can be used according to the invention can be obtained from other *Streptomyces* than the *fradiae*, or from micro-organisms belonging to other genera, especially the genus *Bacillus*.

The products, A, B or C defined above can be used for the preparation of foodstuff compositions for animals which can be formulated on the basis of the following examples:

A. TESTS ON RATS

Example 1.—Rats receiving a McCollum feed

The composition of this feed is as follows: 60% sugar, 12% wheat flour, 18% casein, 3% yeast, 3% lard, 4% McCollum salts.

White albino rats aged 3 weeks and weighing about 40 g. are divided into 5 male or 5 female rats per cage; they take the feed and drinking water voluntarily; they are weighed individually twice weekly for 3 weeks; the average daily growth is then determined on groups of 10 animals (5 males and 5 females).

The comparison group received the McCollum Feed.

The experimental groups receive this same feed supplemented with enzymes either at a dose of 100 A.U./g. or at a dose of 1,000 A.U./g. Generally a growing rat daily consumes $\frac{1}{10}$ of its weight in food (representing 10 g. of food per day for a rat weighing 100 g.), therefore those doses correspond respectively to 10,000 and 100,000 A.U. per kg. of live weight per day.

The enzymes used are those in which the effect on the mucus is illustrated by FIG. 1. Apart from enzyme S.F. batch 2 (S.F.=*Streptomyces fradiae*), which causes a 50% reduction in viscosity of the mucus, enzymes S.F. batch 1 and S.F. batch 3 are used, which respectively cause 40 and 60% reduction in viscosity of the mucus. These 3 batches satisfy the RMV test in the broad sense because they cause a reduction in viscosity of between 35 and 65%, but only batch 2 satisfies the preferred RMV test. These 3 batches correspond to Product C defined above and contain about 2,000 A.U./mg.

The results obtained are given in Table I.

TABLE I

Effect of the enzymes on the reduction in viscosity of the mucus (according to the RMV test) and on the growth of the rats

| Nature of the enzyme | Reduction in viscosity, percent | Without enzyme, g./day | Growth of the rats with— | | | |
| --- | --- | --- | --- | --- | --- | --- |
| | | | 100 A.U. per g. of food | | 1,000 A.U. per g. of food | |
| | | | g./day | Percent | g./day | Percent |
| Papain | 0 | 2.85 | | | | |
| | 30 | | 2.85 | 100 | 2.85 | 100 |
| SF batch: | | | | | | |
| 1 | 40 | | 3.45 | 121 | 3.40 | 119 |
| 2 | 50 | | 4.15 | 145 | 4.05 | 142 |
| 3 | 60 | | 3.25 | 114 | 2.95 | 103 |
| BS | 80 | | 3.00 | 105 | 2.40 | 84 |

NOTE.—SF=Streptomyces fradiae enzyme; BS=Bacillus subtilis enzyme.

The enzyme of SF batch 2, of which the effect on the mucus is exactly between that of trypsin and of chymotrypsin (reduction in viscosity: 50%) causes an increase in the speed of growth of the rats of between 40 and 45% for the 2 doses used.

For enzyme SF batch 1, the effect of which on the mucus is comparable with that of chymotrypsin (reduction in vsicosity: 40%), this increase is less but remains about 20% for the two doses used.

For enzyme SF batch 3, of which the effect on the mucus is comparable with that of trypsin (reduction in viscosity: 60%), this increase is still 14% at a low dose but becomes practically zero at a high dose.

Thus the batches of SF enzymes which satisfy the RMV test to different extents have a different favorable effect on the growth of the rats. Furthermore, if SF is fermented without using the process of this invention, batches of enzymes are obtained which do not satisfy the RMV test because of an excessive effect, and which have a markedly unfavorable effect on the growth of the rats.

Papain, which does not satisfy the RMV test because it has an inadequate effect has no effect on the growth of the rats.

An enzyme of Bacillus subtilis which does not satisfy the RMV test because it has an excessive effect, shows a slight favorable effect on the growth of the rats at a low dose, but this effect is not constant; furthermore, it becomes very unfavorable at a high dose. On autopsy, the intestinal wall of the rats which have received this high dose shows signs obvious to the naked eye of a hypersecretion of mucus which explains the observed retardation in growth.

Finally, trypsin and chymotrypsin cause a slight and inconstant increase in the speed of growth of the rats, which is always less than 10%. These pancreatic enzymes which, in vitro, have a comparable effect on the mucus to that of enzymes SF batches 1, 2 and 3, thus have a markedly lesser effect on the growth of the rats in vivo. This anomaly can be explained by the fact that trypsin and chymotrypsin in excess are, in vivo, blocked by endogenic trypsin inhibitors such as the Kunitz pancreatic inhibitor; against this, the enzyme which predominates in batches 1, 2 and 3 obtained from Streptomyces fradiae is practically insensitive to this inhibitor, just as it is practically insensitive to the exogenic inhibitors such as soya inhibitor.

Example II.—Rats receive a food rich in soya proteins

This food, normally used for growing chickens, has the following composition: cornflour 60%, soya flour 33%, lard 3%, mineral and vitamin compound 4%. The experiment is carried out on groups of 10 male rats under the same general conditions as the preceding experiment.

The comparison group has an average growth of 5.25 g./day.

The experimental group 1 which received the same food supplemented with enzyme SF, batch 2, at a dose of 1,000 A.U./g., (corresponding to about 100,000 A.U. per kg. of live weight and per day) has the same average daily growth.

Experimental group 2, which received the same food but received drinking water in which enzyme SF, batch 2, is dissolved at a dose of 500 A.U./m. (also corresponding to about 100,000 A.U. per kg. of live weight and per day) has an average growth of 7.3 g./day, which thus gives an increase of 39%.

The lack of success observed for experimental group 1 is not due to the presence of the Northrup trypsin inhibitor in the soya, because this inhibitor had been destroyed by the heat treatment normally carried out by the supplier of this raw material. Rather, this lack of success is due to the fact that the enzyme appears to have a particular affinity for soya proteins, which, when added to the food at high concentration, can capture the whole of the enzyme; hence this enzyme can no longer act on the proteins of the mucus, the viscosity of which will no longer be reduced. However, if the enzyme is added to the drinking water instead of being added to the food, this capture will in part be avoided, and hence the success obtained with the experimental group 2. It is thus generally preferable to add the enzyme to the drinking water; experience furthermore shows that the stability of the enzyme in solution is sufficient for this method of administration to be practicable in industrial breeding.

Example III.—Investigations on the isolated intestinal tract

The purpose of these investigations is to directly demonstrate the increase in the speed of absorption of foodstuffs through the intestinal wall.

An operation is carried out on five rats which had been dieting for 24 hours, weighing about 150 g. and anaesthetised with urethane. After opening the abdominal cavity, about 10 cm. of ileum are isolated, each end being connected to the exterior by a probe; the ileum is washed and 0.4 ml. of a solution of a casein hydrolysis product containing 2.5 mg. of nitrogen are then introduced. The solution is left in place in the ileum for 10 minutes and is then collected. A rinsing solution is introduced and also collected. The residual nitrogen in the solutions collected is determined. The same experiment is repeated on the same rat but with the prior introduction of 0.05 ml. of a solution containing 0.5 mg./ml. of enzymes SF batch 2, representing about 50 A.U.

It is found that the percentage of nitrogen absorbed varies greatly from one animal to the other. The tests in which no enzyme was added have an average of 5% nitrogen. In the other tests the percentage nitrogen varies very little and is much higher because it reaches an average of 17%.

The same technique can be used to study the speed of absorption of other foodstuffs and their possible increase under the influence of the enzyme. It is found that this increase is generally greater for proteins than for carbohydrates or lipids. The increase in the speed of growth due to the enzyme must thus take place to the benefit of the muscular tissues of the animal rather than to the benefit of its reserve substances; it can thus be said that the growth of the animal is not only improved in amount but also in quality.

The same technique can also be used to study the speed of absorption of medicines, the passage of which across the intestinal wall may or may not furthermore be dependent on a specific carrier. It is found that this speed of absorption is generally increased by the enzyme but to varying extents depending on the medicines.

B. EXPERIMENTS ON CHICKENS

Example IV.—Free-range chickens

Male chickens of the Arbor-Acres strain are initially all bred together and receive the same initial feed. At the age of 12 days they are divided into 4 groups of 25 of the same average weight c9124 g.) and the same standard deviation (3.28).

The comparison group 1 receives a food based on maize and soya with a low protein concentration (16%). At the end of the experiment, at the age of 58 days, that is to say after 46 days of the experiment, the average weight is 1,430 g. and the consumption index (ratio of the weight of food consumed to the weight of the animals) is 2.30.

The experimental group 1 receives the same food supplemented by 4 g./kg. of the product B defined above, containing 100 A.U./mg.; the dose of enzyme is thus 400 A.U./kg. of food, which corresponds to about 40,000 A.U./kg. of live weight and per day. At the end of the experiment, the average weight is 1553 (+8%) and the consumption index is 2.15 (−7%).

The comparison group 2 receives a food based on maize and soya, having a normal concentration of proteins (22%). At the end of the experiment, the average weight is 1,676 g. and the consumption index 2.09.

The experimental group 2 receives the same food, also supplemented at a dose of 400 A.U. per kg. of food. At the end of the experiment, the average weight is 1,772 g. (+6%) and the consumption index is 1.98 (−5%).

Example V.—Battery-raised chickens

The experiment relates to 2 batches of about 6,000 chickens of the Vauguard-Garrison strain, battery-raised. The comparison batch receives a commercial food based on soya and maize, in which analysis shows 21% of proteins and 5% of lipids, in the form of a flour, this food is guaranteed to contain 8 mg./kg. of penicillin-procaine and 25 mg./kg. of tetracyclin. The experimental batch receives the same food supplemented by 400 mg./kg. of the product C defined above, containing 2,000 A.U./mg.; the dose of enzyme is thus 800 A.U. per kg. of food, which corresponds to about 80,000 A.U./kg. of live weight and per day.

On the 30th day of the experiment, the chickens apparently show the same development in the 2 batches, but each chicken has on average consumed 1,080 g. of food in the comparison batch and only 903 g. in the experimental batch, resulting in an economy of about 16% in the food.

From the 40th day onwards, an epidemic develops in the whole of the brood, which the experimental batch resists much better.

At the end of the 60 days experiment, the mortalities are 5% for the comparison batch and only 1.6% for the experimental batch.

The average weights are 1,346 g. and 1,319 g. respectively. This slight difference in disfavor of the experimental batch is explained by the fact that in this batch the animals of weak constitution survived whilst they would probably have died in the absence of enzyme.

The consumption indices are 2.8 and 2.63 respectively, resulting in an economy of 6.5% in the food for the experimental batch.

A simple economic calculation shows that the benefits for 1,000 chickens are 64 F. and 266 F., respectively, not taking into account the price of the enzyme.

Control experiment: at the start of the main experiment a group of 25 chickens is taken from each batch and raised on the floor in a separate building where the hygienic conditions are better. The morality is nil for these groups. The average weights are 1,603 g. for the comparison group and 1746 g. (+9%) for the experimental group. The consumption indices are 2.68 and 2.41 (−10%) respectively.

Example VI.—Repetition of Example V

Example V corresponds to an experiment carried out in midsummer during a heatwave from which the animals visibly suffered, whilst Example VI corresponds to an experiment carried out in autumn under more normal climatic conditions.

At the end of a 60 days' experiment, the mortalities are 7.9% for the comparison batch and 4.8% for the experimental batch.

The average weights are 1,338 g. and 1,356 g. respectively.

The consumption indices are 2.73 and 2.38 respectively, resulting in an economy of 12.4% in the food for the experimental batch.

A simple economic calculation shows that the benefits for 1,000 chickens are 77 F. and 469 F. respectively, not taking into account the price of the enzyme.

Comments.—These experiments on chickens were carried out before having suspected the risk of capture of the enzyme by the proteins of the soya, and before having remedied this by adding the enzyme to the drinking water as in Example II. Much better results, and in particular, increases in the speed of growth comparable to those observed in Example II (+39%) can be obtained with chickens by adding the enzyme to the drinking water instead of adding it to the food.

EXPERIMENTS ON CALVES

In this particular case, apart from its main action on the intestinal mucas, an enzymatic product, according to the invention, can also expect a not insignificant effect on the food itself. In effect, about ½ hour frequently elapses between the moment at which the milk reconstituted from milk powder is heated at 37° C. and the moment at which it is consumed by the calves. This period is sufficiently long for the proteins of the milk to be partially degraded by the enzymatic product in a liquid medium at 37° C., which also, to a certain extent, contributes to the overall improvement in the growth of the calves.

Examples V and VI show that in breeding in an industrial farm the mortality is markedly lowered for the experimental batches, and this observation can be interpreted in different ways.

In particular, it is known that pathogenic microorganisms are sometimes abundant in the layer of the deep mucus and that the coccidiae or other parasites sometimes contribute to the formation of intestinal crypts where they become lodged; when these micro-organisms, these coccidiae or these parasites are coated by an excessively viscous mucus, they can escape the effect of the antibiotics, the anti-coccidial agents or the anti-parasitary agents normally added in foodstuffs. The enzymes which can cause a controlled reduction in the viscosity of the intestinal mucus can thus have an activating effect on the antibiotics, the anti-coccidial agents and the anti-parasitary agents, the reduction in mortality observed with the experimental batches can in part be explained in this way. The enzymatic products according to the invention can thus make it possible to reduce the dose of antibiotics, of anti-coccidial agents and of anti-parasitary agents normally added in compound foodstuffs for animals, without reduction in the protection provided by these 3 types of product.

On the other hand, the enzymatic products according to the invention make it possible to increase the speed of absorption through the intestinal wall of certain veterinary medicines as can be demonstrated by the technique described in Example III.

These products can hence be used for the preparation of various veterinary compositions.

The foodstuff compositions for the animals contain at least one of the products A, B or C combined with a physiologically tolerated excipient. They are administered at a dose of 1,000 to 20,000 A.U. per kg. of body weight and per day. By excipient one understands either solids such as lactose or solvents, or coatings which protect the enzymatic products before they are used.

The veterinary compositions which act on the intestinal mucus so as to facilitate the absorption of the medicines contain at least one of the products A, B or C and are administered at a dose of 5,000 to 200,000 A.U./kg. of body weight per day.

The most suitable form of administration in both cases is oral administration.

The results described above relating to experiments carried out on animals can be extrapolated to human beings. To do so, and to achieve the desired effect with complete safety, a product which has been purified to an average extent, for example product D, will be taken in place of using a crude or partially purified enzymatic product. Dietetic and pharmaceutical specialities which act on the intestinal mucus will thus be produced. The dietetic compositions contain at least one of the products D or E and are administered at a dose of 1,000 to 200,000 A.U./kg. of body weight and per day.

The pharmaceutical compositions which act on the intestinal mucus so as to improve the anabolism or increase the efficiency of medicines contain at least one of the products D or E, and are administered at a dose of 5,000 to 200,000 A.U. per kg. of body weight and per day.

Like the intestinal mucus, the bronchial mucus in part owes its viscosity to the presence of macromolecules of mucins joined together by protein bridges. The principle of a controlled effect on the viscosity of the mucus by a controlled effect on the proteins of this mucus is thus equally applicable.

For this reason, trypsin and chymotrypsin have already been proposed in bronchial therapy, but their use has proved to be limited for various reasons, and especially because of the existence of trypsin inhibitors, which are incidentally different from the Kunitz inhibitor, in the bronchial mucus.

Against this, experience shows that these inhibitors have no effect on the enzymatic products belonging to the particular group described above. These products can thus be used for a moderate reduction in the viscosity of the bronchial mucus, which will facilitate the expulsion of the excess mucus and the action of antibiotics.

As the bronchial mucous membrane is more sensitive and less extensive than the intestinal mucous membrane, these products, which can be administered as an aerosol or in any other suitable administrative form, will preferably be highly purified products such as product D for animals and products D or E for human beings, and will be used at relatively low doses, generally of between 500 and 50,000 A.U. per kg. of body weight and per day.

Like the intestinal mucus, the cervical mucus in part owes its viscosity to macromolecules of particularly large size, linked together by protein bridges. The principle of a controlled effect on the viscosity of the mucus by a controlled effect on the proteins of this mucus is thus equally applicable.

The controlled effect on the viscosity of the cervical mucus appears distinctly desirable in the practice of artificial insemination of cattle, which is currently under active development. In fact, the degree of success at the first attempt is 65% on average, which can in part be explained by the fact that an excessively viscous cervical mucus sometimes causes the formation of a cervical plug which blocks the neck of the uteras and stops the travel of the spermatazoa.

Furthermore, it is now recognized that the success of insemination is in part due to the presence of a sufficient trypsin activity in the semen, which will ensure the activation of the spermatazoa. It is also known that the cervical mucus can contain certain trypsin inhibitors.

The enzymatic product belonging to the particular group defined above, which has an activity of the trypsin type, and is generally insensitive to trypsin inhibitors can thus cause a controlled reduction in the viscosity of the cervical mucus and contribute to the activation of the spermatazoa. It can thus facilitate the antibiotic treatment of illnesses which affect the genital tracts and can increase the degree of success at a first attempt both in artificial and in natural insemination.

Since the vaginal and uterine mucous membranes are more sensitive and less extensive than the intestinal mucous membrane, the enzymatic products which will serve for the preparation of the ovulae will preferably be highly purified products, such as product D for animals and products D or E for human beings, and will be used at relatively low doses (generally between 500 and 50,000 A.U. per kg. of weight and per day).

TABLE II

Doses to be administered daily and minimal content of the enzymatic product in accordance with its applications

| Minimal content of the enzymatic product | Doses to be administered daily | | | | | | | |
|---|---|---|---|---|---|---|---|---|
| | Aminals | | | | Human beings | | | |
| | Therapeutic | | | | Therapeutic | | | |
| | Point of action | | | | Point of action | | | |
| | Interstinal mucus | Bronchial mucus | Cervical mucus | Feeding | Intestinal mucus | Bronchial mucus | Cervical mucus | Dietetic |
| 50,000 A.U./ml. 100 A.U./mg. 1,000 A.U./mg. 10,000 A.U./mg. | 5,000 to 200,000 A.U./kg. of body weight. | 500 to 50,000 A.U./kg. of body weight. | 500 to 50,000 A.U./kg. of body weight. | 1,000 to 20,000 A.U./kg of body weight. | 5,000 to 200,000 A.U./kg. of body weight. | 500 to 50,000 A.U./kg. of body weight. | 500 to 50,000 A.U./kg. of body weight. | 1,000 to 20,000 A.U./kg. of body weight. |

I claim:

1. A method for determining whether a proteolytic enzyme will increase the speed of absorption of foodstuffs and medicines orally ingested by animals which comprises obtaining an animal mucus selected from the group consisting of the intestinal mucus, bronchial mucus and cervical mucus; measuring the viscosity of said mucus; applying to said mucus a proteolytic enzyme in an amount of 250 A.U. per gram of mucus and determining if the viscosity of the mucus is reduced by between 65% and 35% relative to the untreated mucus;

and determining whether the proteolytic enzyme is insensitive to trypsin inhibitors.

2. A method according to claim 1 wherein the proteolytic enzyme is produced from *Streptomyces*.

3. A method according to claim 2 wherein the viscosity is reduced from 60% to 40%.

4. A method according to claim 1 wherein the enzyme is produced from *Streptomyces fradiae*.

References Cited
UNITED STATES PATENTS 3,663,690   5/1972   Eichel et al. _____ 424—94

OTHER REFERENCES

Chugh et al.: "J. Bact *71*: 72–727 (1956).
Chemical Abstracts *64*: 2509h (1966).
Chemical Abstracts *63*: 1006d (1965).

A. LOUIS MONACELL, Primary Examiner

M. D. HENSLEY, Assistant Examiner

U.S. Cl. X.R.
424—94; 195—29